United States Patent [19]

Kress

[11] 3,953,845
[45] Apr. 27, 1976

[54] OIL LEVEL INDICATOR
[75] Inventor: Leonard Kress, Deer Park, N.Y.
[73] Assignee: Lawrence Peska Associates, Inc., New York, N.Y. ; a part interest
[22] Filed: Feb. 4, 1975
[21] Appl. No.: 547,007

[52] U.S. Cl. ............................ 340/244 B; 200/84 R
[51] Int. Cl.² ............................................ G08B 5/36
[58] Field of Search .................. 340/244 A, 244 B; 200/61.2, 61.21; 73/308; 200/84 R

[56] References Cited
UNITED STATES PATENTS

| | | | |
|---|---|---|---|
| 1,297,938 | 3/1919 | Varner | 200/84 R |
| 1,522,355 | 1/1925 | Winterhoff | 200/84 R |
| 1,560,318 | 11/1925 | Reed | 200/84 R |
| 1,712,665 | 5/1929 | Gregory | 340/244 B |

Primary Examiner—S. Clement Swisher
Assistant Examiner—Denis E. Corr
Attorney, Agent, or Firm—Jack D. Slobod

[57] ABSTRACT

An oil level indicator for an automobile or other engine is provided with a float which is coupled to a generally vertical rod. The generally vertical rod is electrically conductive and is moved axially responsive to the position of the float. A stationary contact is selectively positioned in interfering relationship with the rod at a point along its axial travel. Touching of the rod and the contact completes a circuit indicating depletion of the oil level to some predetermined point.

1 Claim, 2 Drawing Figures

OIL LEVEL INDICATOR

BACKGROUND OF THE INVENTION

The invention relates to engines and particularly to oil level indicating means for engines. The prior art includes various apparatus intended to display an indication of the level of a liquid. These include the following U.S. Pat. Nos.: 3,787,829; 3,786,463; 3,781,858; 3,792,456; and 3,820,098. The apparatus shown therein in general is more complex than is desirable for a mass produced product which must be highly reliable and capable of being inexpensively and easily manufactured.

It is a primary object of the invention to provide apparatus which is highly reliable, simple and inexpensive to manufacture, simple to use and which may be installed on existing automobile engines.

SUMMARY OF THE INVENTION

It has now been found that these and other objects of the invention may be attained by indicating apparatus for warning of oil levels below a predetermined level in an automobile crankcase which includes a chamber in fluid communication with the crankcase. The chamber is disposed at an elevation where a portion thereof coincides with the predetermined level and has a float disposed therein. A generally vertical electrically conductive rod is carried for axial movement. The rod has a flexible electric conductor affixed thereto and a post is disposed proximate and parallel to the rod. A contact is carried by the post for contact with the rod in at least one axial position thereof. The contact is selectively positionable at a plurality of discrete axial positions along the post. The contact is connected in series with electrical power and a warning light and also the flexible electric conductor. Means are provided for axially moving the rod responsive to the position of the float within the chamber. Accordingly when the float falls responsive to falling liquid level the rod moves axially to complete an electric circuit which causes a light to illuminate at some predetermined axial position of the rod.

Normally the means for moving the rod responsive to the float position includes an arm having the float carried at one end thereof and at the other end a surface which contacts the rod. Intermediate the ends thereof is disposed a pivot member engaging said arm and particularly permitting pivotal motion thereabout by the arm.

BRIEF DESCRIPTION OF THE DRAWING

The invention will be better understood by reference to the accompanying drawing in which.

DESCRIPTION OF THE PREFERRED EMBODIMENT

Figure 1:
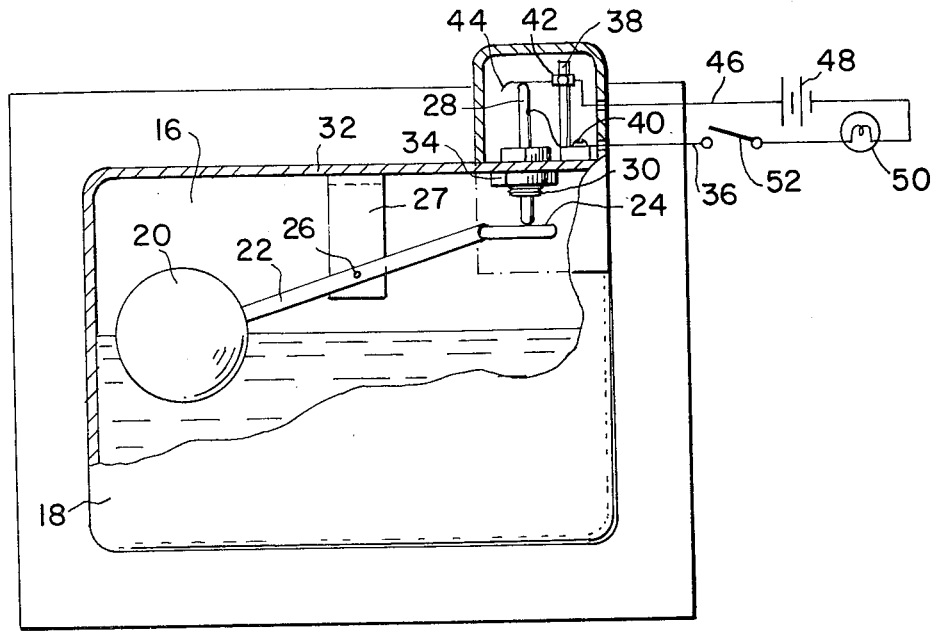
FIG. 1 is a side elevational view partially broken away of the apparatus in accordance with the invention.
Figure 2:
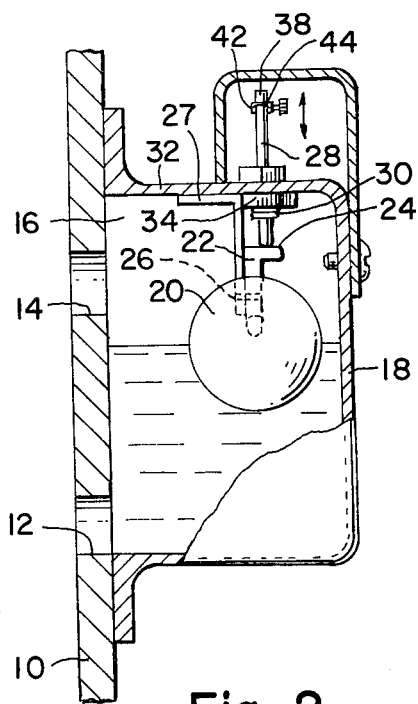
FIG. 2 is a partially broken away end elevational view of the apparatus shown in FIG. 1.

Referring now to FIGS. 1 and 2 there is shown a portion of an oil pan 10 of internal combustion engine such as that particularly used in an automobile. It will be understood that the oil pan carries the oil supply for the engine (not shown). A pair of holes 12, 14 in the side wall of the oil pan 10 communicates with the chamber 16 defined by the housing 18 of the apparatus in accordance with the invention. The oil level within the chamber 16 will rise and fall responsive to the level within the oil pan 10. In accordance with the well known physics principle the level in the chamber 16 will be the same as the level in the oil pan. The hole 14 is provided to insure that there is a free flow of air between the chamber 16 and the interior of the oil pan 10. It will be apparent to those skilled in the art that any variation in air pressure within the chamber 16 above the oil disposed therein would tend to vary the level of the oil. More particularly hole 14 is necessary to insure that no pressure differential exists.

Disposed within the chamber 16 is a float 20 which is fixed to one axial extremity of a float arm 22 which has a generally horizontal planar surface 24 disposed at the other axial extremity thereof. A pivot pin 26 passes loosely through the arm 22 and engages a bracket 28 carried by the housing 18.

The generally planar end 24 of the float arm 22 engages an electrically conductive elongated rod 28 which is carried for axial movement within a plug 30. The plug 30 is fixed to wall 32 of the housing 18 by means of a nut 34. A flexible electric conductor or wire 36 is fixed to the rod 28 at a point axially spaced from the plug 30. An upstanding post 38 is fixed to the wall 32 of the housing 18 by means of a screw 40. A collar 42 is selectively positioned at various axial positions along the post 38 for selective engagement between a contact bar 44 carried by the collar 42. The contact bar 44 is attached to a wire 46 which is connected to a battery 48 which in turn connected in series with a light 50 and a switch 52.

In operation the apparatus in accordance with the invention will be most often used to indicate the fall of the oil level within the oil pan 10 to some predetermined level. Most frequently it will be desirable to indicate when the oil level in the oil pan 10 has fallen to 1 quart below the normal level. Calibration of the apparatus in accordance with the invention will be accomplished by filling the oil pan to a level just 1 quart below the normal oil quantity. Thereafter the collar 42 is adjusted along the post 38 such that the contact bar 44 just contacts the rod 28. Then the additional quart of oil may be added to the oil pan 10 which causes additional oil to flow into the chamber 16 thereby raising the float 20 causing the arm 22 to pivot around the pivot pin 26 and thereby cause the end 24 thereof to go downward. Gravity will cause the rod 28 to also move downward absent some upward force against the lower extremity thereof and thereby break the electrical connection between the rod 28 and the contact bar 44. It will be understood that the switch 52 may be a separate switch provided on the dash of the vehicle or in other forms of the invention may be merely one contact on the ignition switch which is automatically closed whenever the ignition is on. With the switch 52 closed the light 50 will be illuminated whenever the oil quantity thereafter falls to or below 1 quart less than the volumetric standard for that particular oil pan 10. An advantage of using a separate switch 52 is that it facilitates the retrofit of the apparatus in accordance with the invention into existing engines. An advantage of using a switch which is part of the ignition switch is that an immediate warning is given upon the fall of the oil level without the necessity for the operator making a conscious effort to close a switch to determine if a potential problem exists.

Having thus described my invention, I claim:

1. An indicating apparatus for warning of an oil level below a predetermined level in an automobile crankcase which comprises: a chamber in fluid communication with the engine crankcase; an elongated arm pivotly mounted in said chamber at a point intermediate the length of said arm; a float carried at one end of said arm; a generally planar tongue formed on the other end of said arm making an angle with the longitudinal axis of the arm; a generally vertical electrically conductive rod carried for sliding vertical movement in said chamber, said rod being unconnected to said arm but having a lower end resting on said tongue for following the movement thereof; a post disposed proximate and parallel to said rod; a contact carried projecting from said post for engagement with an upper end of said rod; said contact being selectively adjustably positionable along said post; said contact and rod lying in a series circuit including a warning lamp.

* * * * *